(12) United States Patent
Germain

(10) Patent No.: US 12,374,103 B2
(45) Date of Patent: Jul. 29, 2025

(54) METHOD AND SYSTEM FOR CONTROLLING AN AGRICULTURAL TREATMENT

(71) Applicant: CARBON BEE, Châteauneuf-sur-Isèr (FR)

(72) Inventor: Gerald Germain, Châteauneuf-sur-Isè (FR)

(73) Assignee: CARBON BEE, Châteauneuf-sur-Isè (FR)

( * ) Notice: Subject to any disclaimer, the term of this patent is extended or adjusted under 35 U.S.C. 154(b) by 389 days.

(21) Appl. No.: 17/999,380

(22) PCT Filed: May 19, 2021

(86) PCT No.: PCT/EP2021/063397
§ 371 (c)(1),
(2) Date: Nov. 18, 2022

(87) PCT Pub. No.: WO2021/234063
PCT Pub. Date: Nov. 25, 2021

(65) Prior Publication Data
US 2023/0206627 A1    Jun. 29, 2023

(30) Foreign Application Priority Data
May 20, 2020    (FR) .................... FR2005355

(51) Int. Cl.
*G06V 20/10*    (2022.01)
*A01M 7/00*    (2006.01)
*G06V 10/82*    (2022.01)

(52) U.S. Cl.
CPC .......... *G06V 20/188* (2022.01); *A01M 7/0089* (2013.01); *G06V 10/82* (2022.01)

(58) Field of Classification Search
CPC .... G06V 20/188; G06V 10/82; A01M 7/0089
See application file for complete search history.

(56) References Cited

U.S. PATENT DOCUMENTS

| | | | |
|---|---|---|---|
| 6,785,400 B1 * | 8/2004 | Farina .................... | G01N 21/47 356/414 |
| 9,609,859 B2 * | 4/2017 | Stowe ................... | A01M 15/00 |
| 10,568,316 B2 * | 2/2020 | Gall .................... | G01N 21/4738 |
| 11,483,958 B2 * | 11/2022 | Wallach ............... | G05D 1/0278 |

(Continued)

OTHER PUBLICATIONS

Notification under Article 94(3) EPC dated Feb. 13, 2025 for European Application No. 21727139.4.

*Primary Examiner* — Manav Seth

(57) ABSTRACT

Computerized method for controlling an agricultural treatment in which; a receiver module receives a two-dimensional image of an agricultural area acquired by a sensor; a processing module (16) determines a time period for activating an agricultural treatment device for agriculturally treating a portion of the agricultural area identified by a neural network (20) processing the image as requiring an agricultural treatment. The time period has a predetermined duration which includes a time of treating the portion of the agricultural area around an average time determined for a virtual portion of the agricultural area, identified as requiring an agricultural treatment and determined in the horizontal plane of the agricultural treatment device (3).

10 Claims, 8 Drawing Sheets

(56) References Cited

U.S. PATENT DOCUMENTS

| | | | |
|---|---|---|---|
| 12,058,994 B2* | 8/2024 | Janssen | A01M 21/02 |
| 2015/0245565 A1* | 9/2015 | Pilgrim | A01C 21/00 239/71 |
| 2017/0039425 A1* | 2/2017 | Itzhaky | G06V 20/188 |
| 2019/0150357 A1 | 5/2019 | Wu et al. | |
| 2020/0045953 A1* | 2/2020 | Serrat | A01M 7/0042 |

* cited by examiner

[Fig. 1]
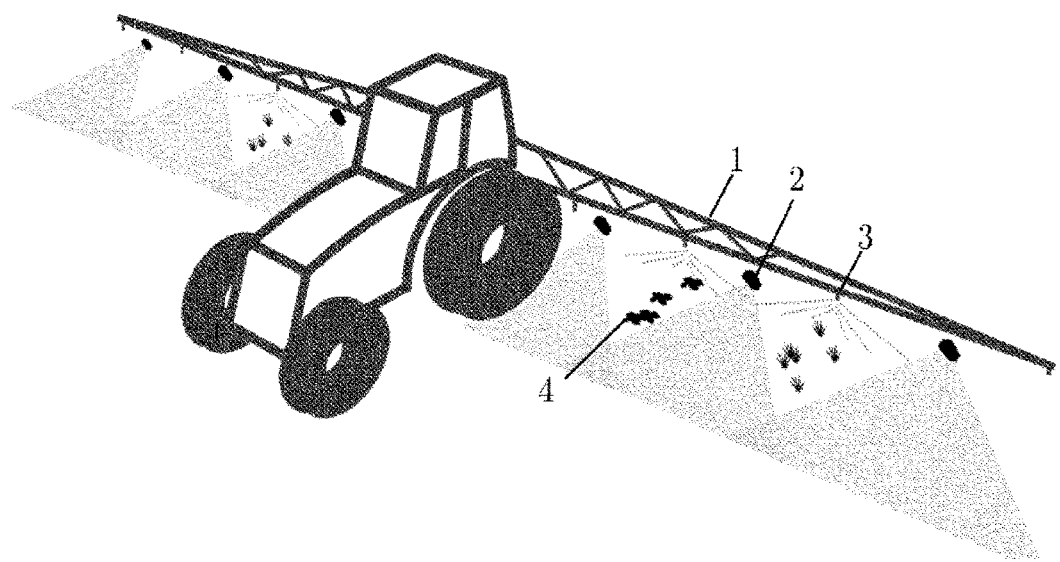
[Fig. 2]
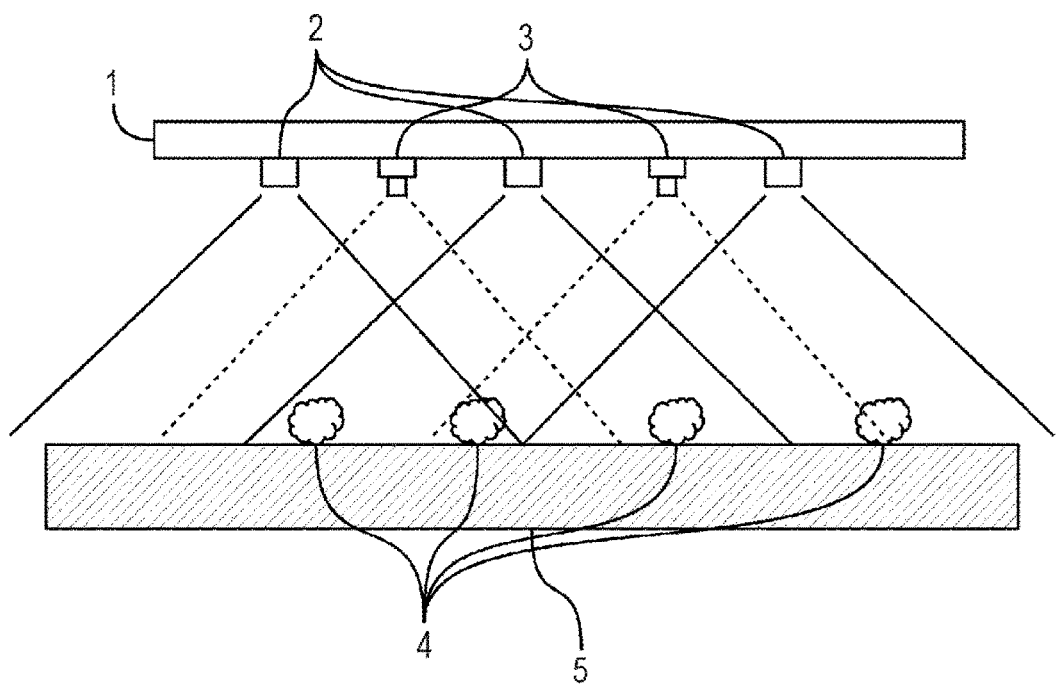

[Fig. 3]
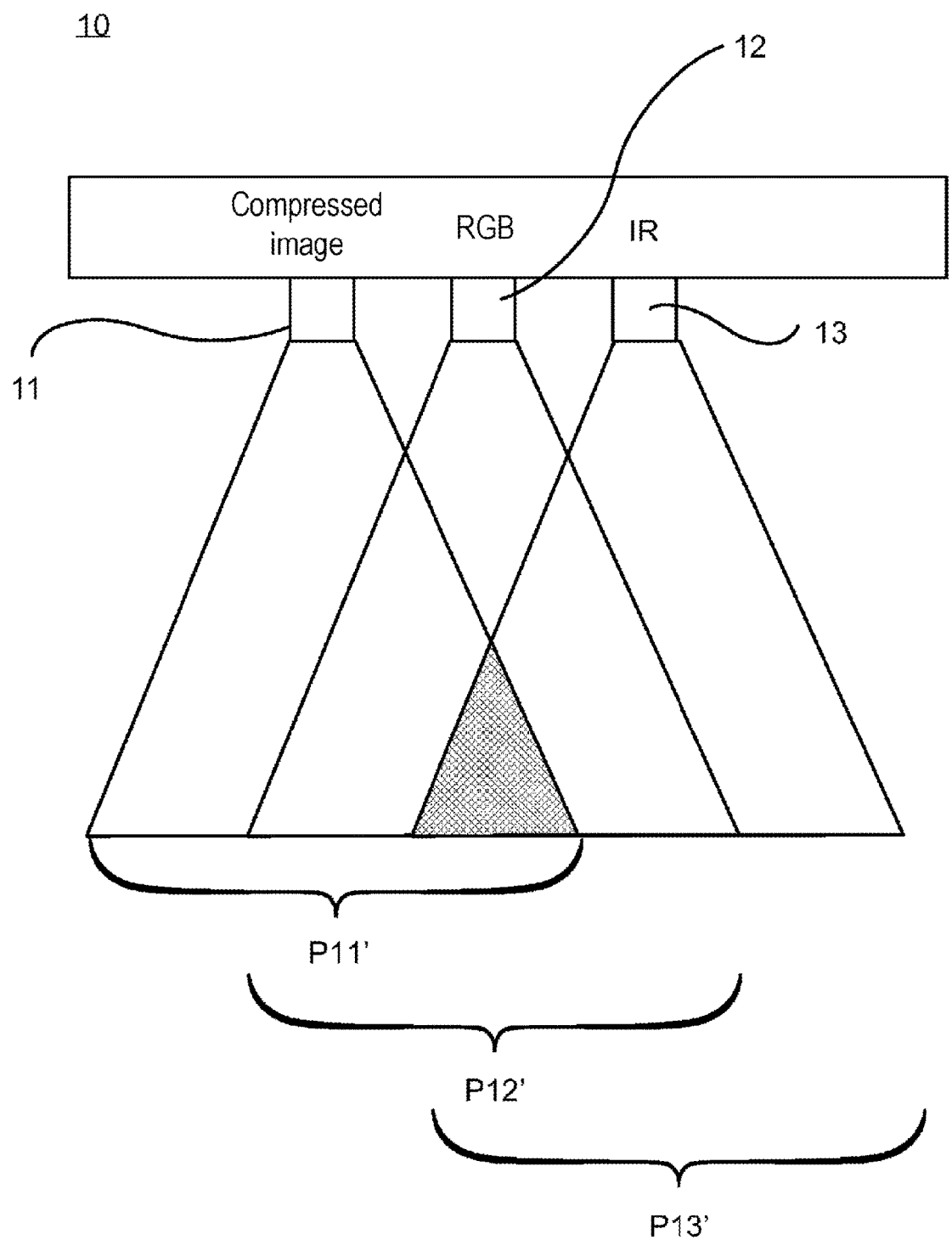

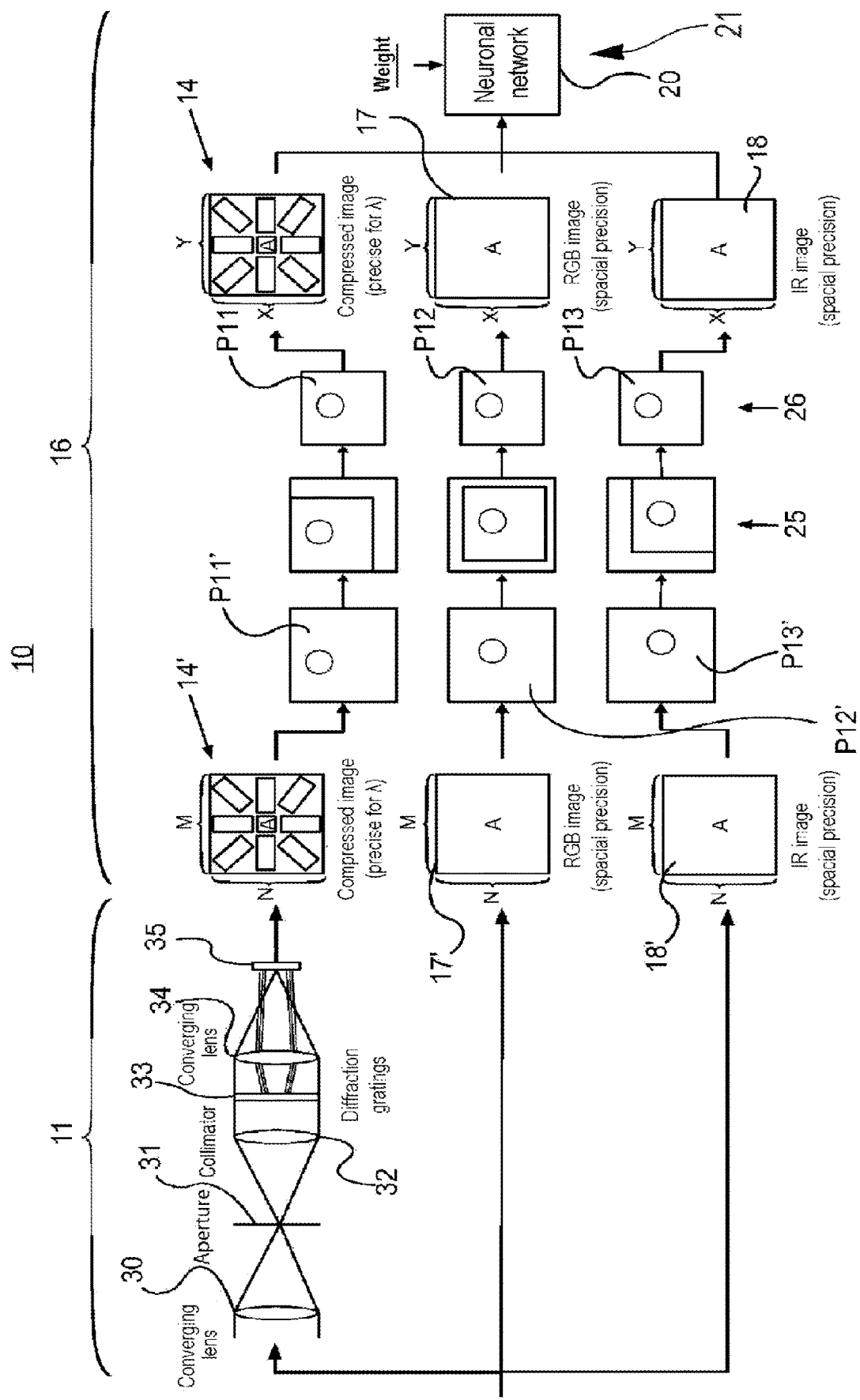
[Fig. 4]

[Fig. 5]
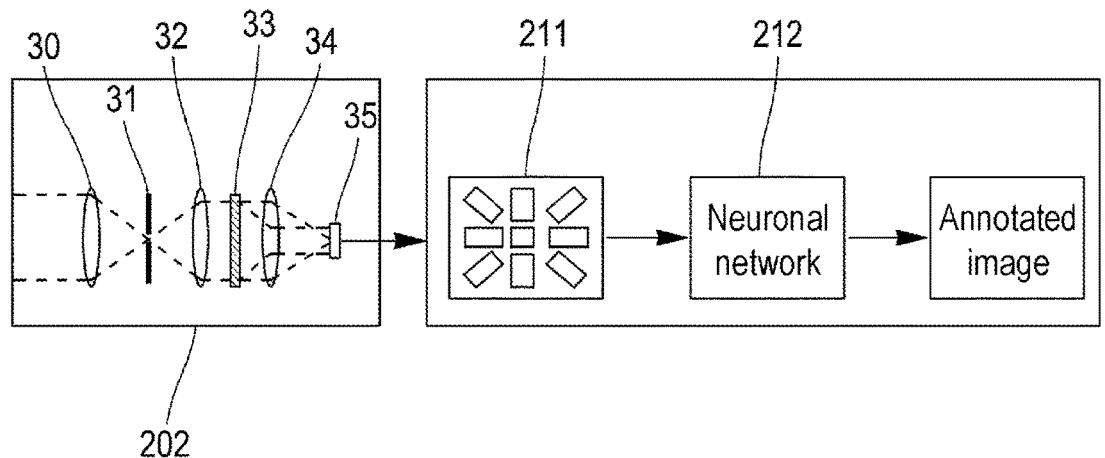
[Fig. 6]
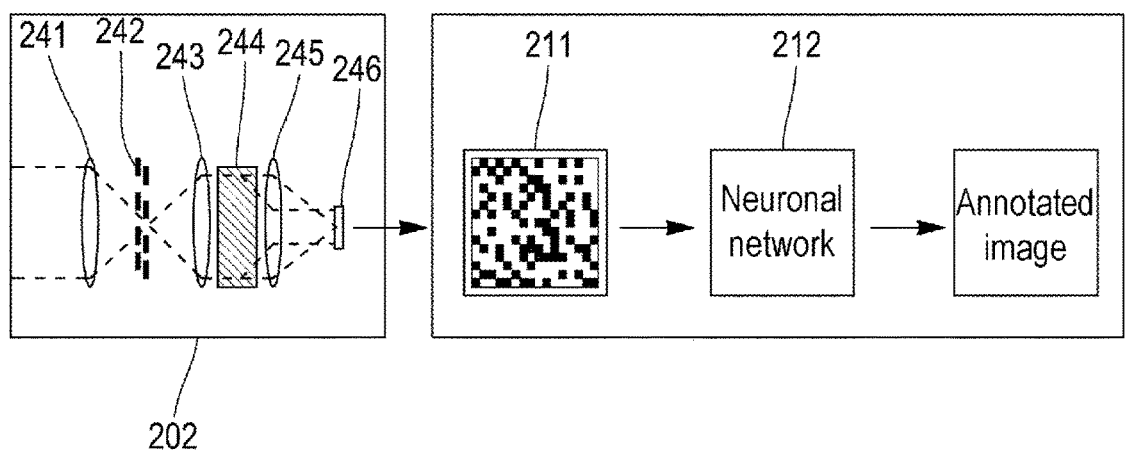

[Fig. 7]
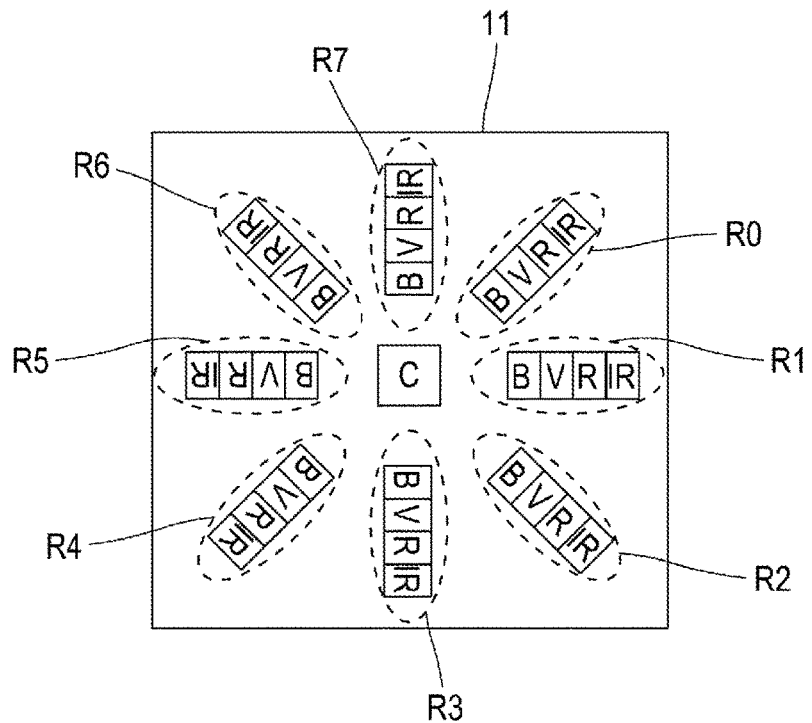
[Fig. 8]
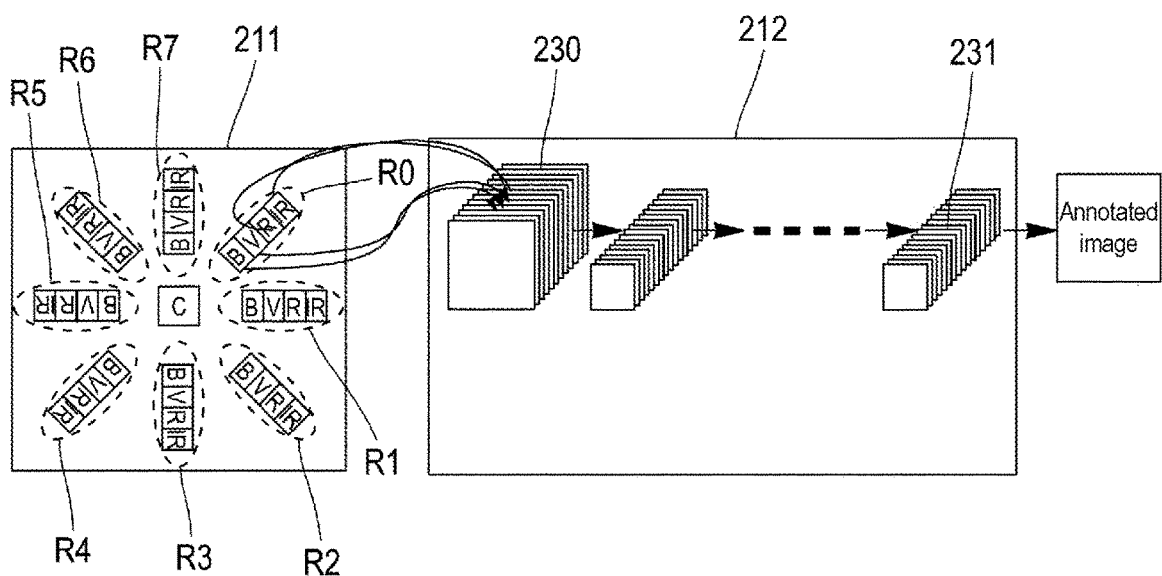

[Fig. 9]
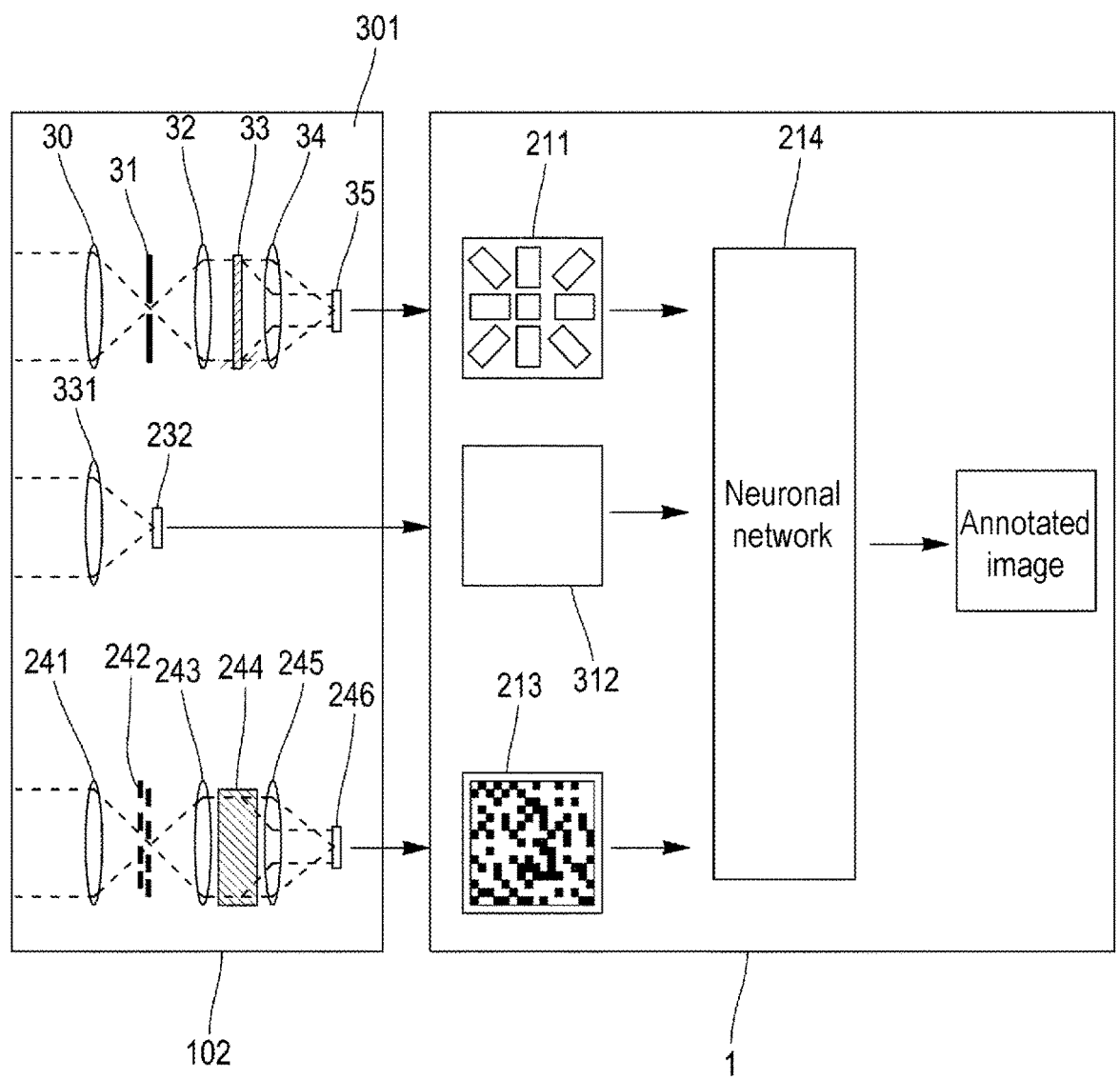

[Fig. 10]
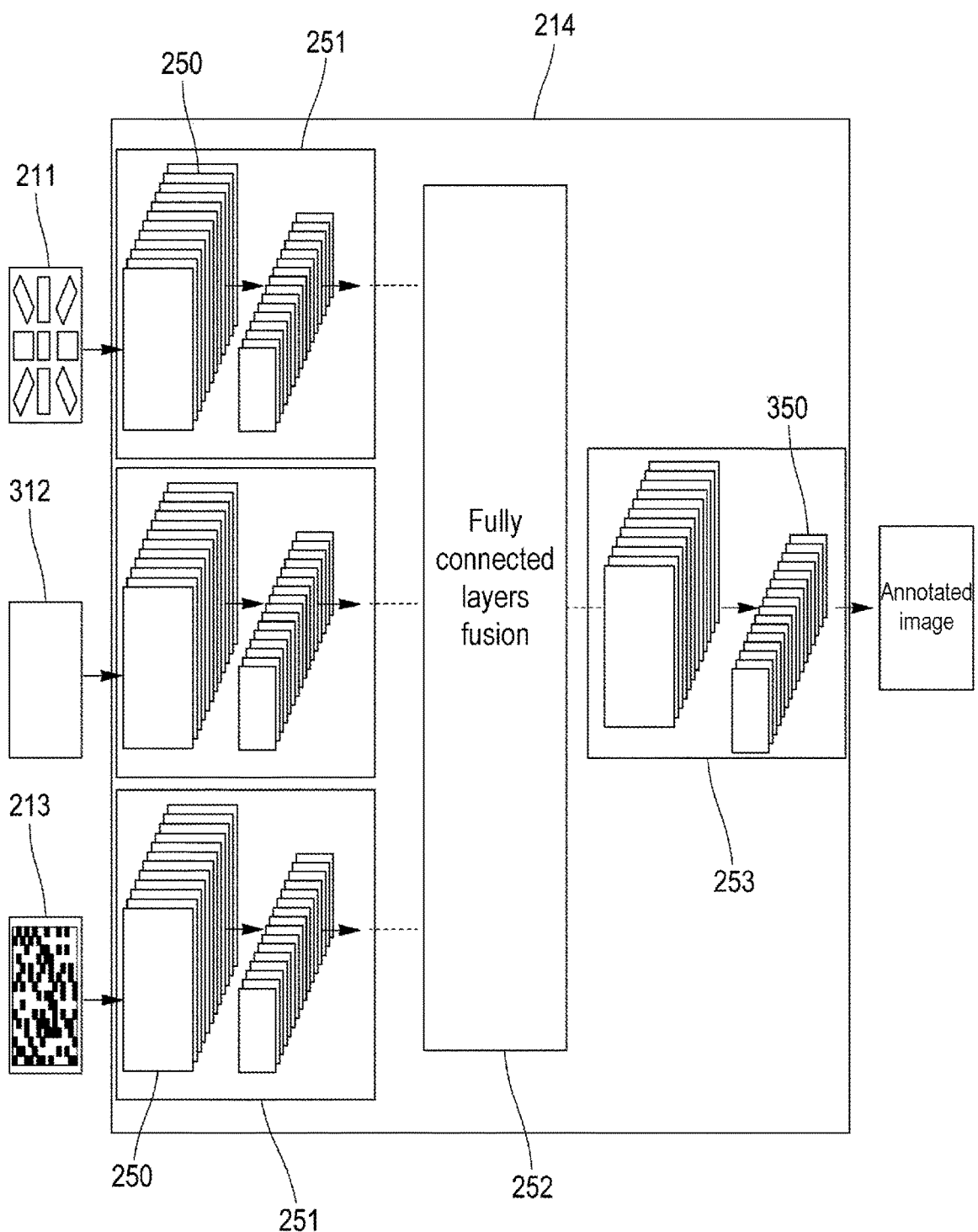

[Fig. 11]
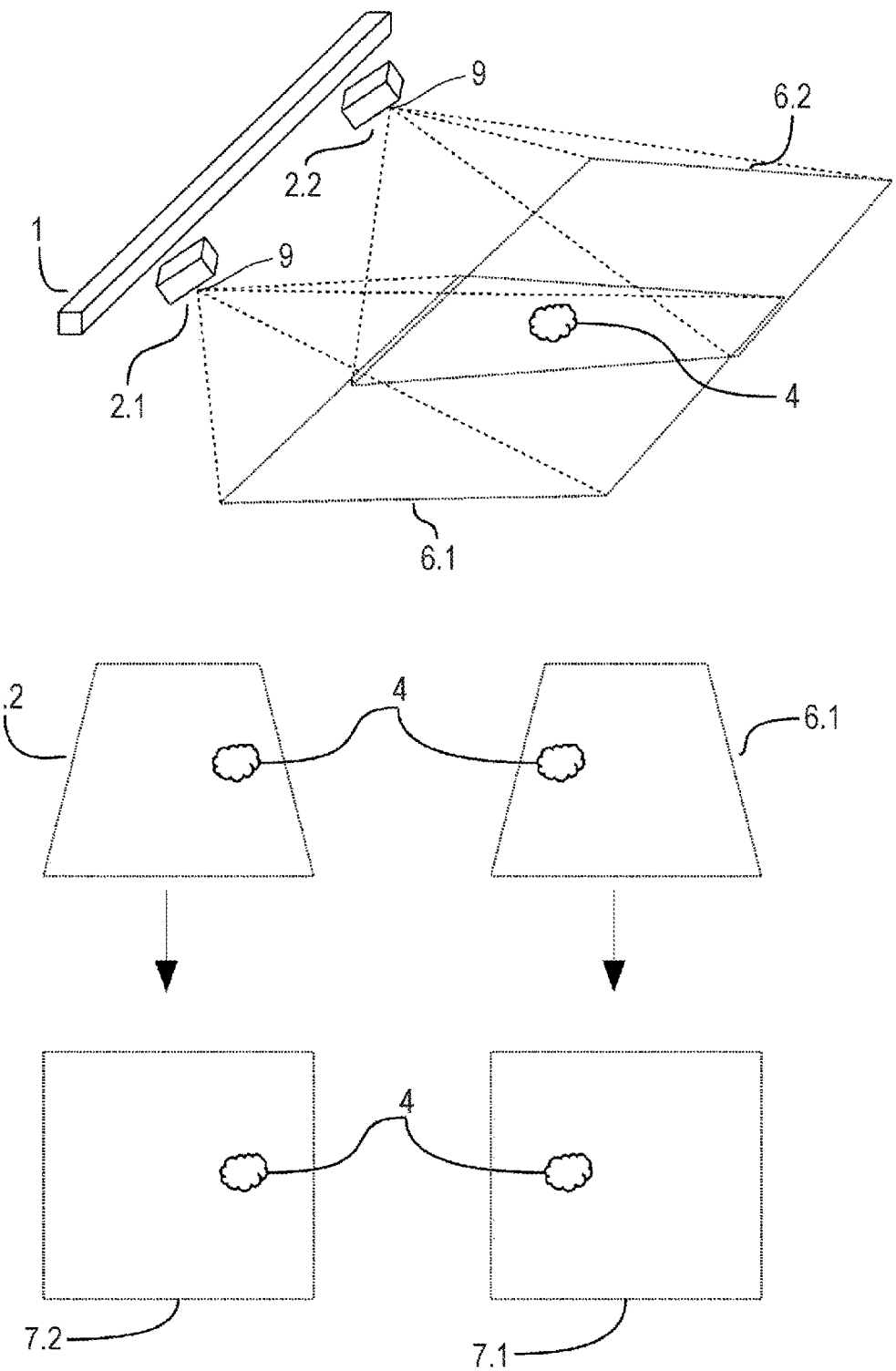

METHOD AND SYSTEM FOR CONTROLLING AN AGRICULTURAL TREATMENT

CROSS-REFERENCE TO RELATED APPLICATION

This application is a national stage application, filed under 35 U.S.C. § 371, of International Patent Application No. PCT/EP2021/063397, filed on May 19, 2021, which claims the priority of Korean application No. FR2005355, the contents of which are incorporated by reference.

FIELD OF THE INVENTION

The present invention relates to agricultural treatment control methods and systems.

TECHNOLOGICAL BACKGROUND

Agricultural crops require regular maintenance to optimize agricultural production. Treatments for fertilization, for herbing, for controlling deficiencies, or for controlling diseases or pests are necessary in order to optimize the production yield of these cultures.

Modern cultural techniques tend to reduce intrants and treatments, for this purpose, they propose various methods in order to address these problems.

Prophylactic measurements, the objective of which is to reduce to the maximum the number of weeds present on an agricultural plot competing with the crop, are widely used in the technical routes of large crops and vegetable crops. The following methods are recommended for this purpose:

Culture rotations were one of the first theorized methods from the start of the XXth century, as described in the document "Clyde E. Leighty, 1938 Yeast of Agriculture", consisting of an alternation of the autumn and spring cultures in order to break certain biological cycles of the weeds;

Ploughing makes it possible to reduce the number of weed plants in the culture by burying the seeds thereof;

False sowing, as described in the document "Evaluating Cover Crops for Benefits, Costs and Performance within Cropping System Niches." Agronomy Journal 97(1). American Society of Agronomy: 322-32, by lifting fast-lifted weeds destroyed before the sowing of the culture also makes it possible to reduce the level of weeds present in the culture.

The recommended curative measurements, the objective of which is to prevent the emergence of weeds in the culture, and to have an impact on the yield of the latter are the following:

Chemical weeding, as described in the document "Pulvérisation en grandes cultures. Les clés de la réussite" ("Pulverization into large cultures. The keys to success"), Arvalis, make it possible to avoid the lifting of weed events in the culture. The plant protection products dedicated to chemical weeding are suitable either for a pre-emergence treatment making it possible to avoid the germination of the weeds present in the form of seeds, or for a post-emergence treatment, making it possible to destroy the weeds that have grown in the culture. Chemical weeding is either selective, making it possible to treat a typology of weeds or non-selective, making it possible to destroy all the plants present in the parcel at the time of treatment. The repeated use of one and the same chemical group of weeding product leads to the appearance of strengths of the weeds, as well as phytotoxicity having an impact on the yield of the culture. The chemical weeding products are applied to the parcel by means of a sprayer;

Mechanical weeding as described in the document "La bineuse, un outil adapté à une large gamme de sol" ("hoe, a tool adapted to a wide range of soil"), Arvalis, in pre-emergence or post-emergence, makes it possible to destroy either the plantlets of weeds or the weeds at a more advanced stage. This method of weeding improves the structure of the soil and also disrupts the cycle of certain pesters. The tools used for mechanical weeding are rotary harrows or hoes for full weeding or tooth-hoes for inter-row or under-row treatment;

Alternative methods are developed, as described in the document "Alternative methods in weight management to the use of glyphosate and other herbicide", pesticide action network Europe, 2018 (second edition), with in particular the treatment of the weeds by injection of an electric current, consisting in destroying each collected weeds by bursting of the biological cells by causing evaporation of the water contained therein, the treatments of the weeds by heat, the methods of which are based on the use of laser, or high-pressure hot water, make it possible to selectively destroy the weeds by a calory intake sufficient to destroy the biological cells of the weed.

Methods for treating deficiencies and diseases or for controlling recommended pests are essentially based on chemical treatments.

The treatments, whether chemical, mechanical or alternative, are carried out by a machine, generally attached to a motorized vehicle which moves in the culture.

These treatments are traditionally wide and do not take into account the presence or absence of weeds, pests, deficiencies or diseases, by treating the entire agricultural parcel homogeneously. This method of control is not very precise and results in over-use of the plant protection products when the treatment is chemical, or a reduced working rate when the treatment is mechanical or alternative.

In this context, the thesis "Segmentation d'images pour la localisation d'adventices. Application à la réalisation d'une système de vision pour une pulvérisation spécifique en temps réel » ("Segmentation of images for the location of weed. Application to the realization of a vision system for a specific spraying in real time"), Jeremie Bossu, University of Bourgogne/CNRS 5158, 4 Dec. 2007, describes an experimental device for controlling spreading comprising a camera mounted on an agricultural machine, a central unit for detecting and calculating the optimal spraying instant, taking into account the position of the plants in the images acquired by the camera. The prototype was tested on a painted road.

Document WO2012/032245, "control system for agricultural spreading", describes a spreading control system comprising a set of spreading nozzles, means for mapping plants to be treated using, in one embodiment, cameras, and means for controlling the spreading as a function of the mapping data produced. This control system requires a first pass of the system into the agricultural parcel in order to produce a map of this agricultural parcel used in a second pass for the application of the treatment.

Document WO2012/122988, "spray ramp for selectively spraying a weeding composition on dicotyledons", describes a method making it possible to discern a category of weeds among other weeds in order to selectively treat the weeds concerned by the detection. This method uses a stereoscopic camera in order to discern weeds, and does not make it possible to discern weeds of the same family, for example dicotyledonous weeds, at early stages. Likewise, this method is not suitable for detecting leaf symptoms of deficiencies or diseases.

Document US2018/0240228, "Selective plant detection and treatment using green luminance photometric machine vision scan with real time chromaticity operations and image parameter floors for low processing load", describes a method allowing the detection of plants in an image and to target the latter in a treatment. This method is not suitable for a selective detection of the families of weeds, nor for the detection of leaf symptoms of deficiencies or diseases.

Document FR3063206 requires a distance measurement system used to acquire information on the distance to the ground of the camera in real time. However, in the agricultural field, attempts are made as far as possible to limit the use of on-board electronic components, which are strained in this environment, which also involves significant maintenance and the associated costs.

SUMMARY OF THE INVENTION

More specifically, the invention relates to a computerized method for controlling agricultural treatment.

A reception module receives at least one two-dimensional image of an agricultural zone acquired by a sensor.

A processing module determines an image projected in the horizontal plane of the agricultural treatment device from said two-dimensional image. The processing module determines a virtual portion of the agricultural zone identified as requiring agricultural treatment in the horizontal plane of the agricultural treatment device by using a neural network processing said projected image. The processing module determines a mean instant corresponding to an instant of treatment of said virtual portion of the agricultural zone by using a relative location of an agricultural treatment device and of the sensor, and a speed of movement of the sensor.

The processing module determines a lower bound and an upper bound of an activation time interval of the agricultural treatment device for the agricultural treatment of a portion of the agricultural zone identified as requiring agricultural treatment, said mean instant being within the activation time interval of predetermined duration such that the time interval includes an instant of treatment of the portion of the agricultural zone.

The invention thus allows real-time treatment of the agricultural parcel, which is dimensioned at the scale of the portions actually requiring treatment.

Thanks to these provisions, a controlled treatment of the agricultural parcel is possible.

According to various aspects, it is possible to provide one and/or the other of the provisions below.

According to one embodiment, the two-dimensional image comprises at least one diffraction comprising hyperspectral characteristics, and wherein the neural network processes said hyperspectral information.

According to one embodiment, the neural network further processes a non-diffracted two-dimensional image of the agricultural zone.

According to one embodiment, the processing module implements a projection taking into account the instantaneous orientation of the sensor.

According to one embodiment, the sensor acquires the two-dimensional image of the agricultural zone, and transmits the bidirectional image to the reception module.

According to one aspect, the invention relates to an agricultural treatment method, in which this computerized method for controlling agricultural treatment is applied, and in which agricultural treatment is applied for the determined time interval.

According to one embodiment, an agricultural treatment device is selected from a plurality of agricultural treatment devices from the locations of a plurality of agricultural treatment devices.

According to one aspect, the invention relates to a computer program comprising program code instructions for executing this method when the program is executed on a computer.

According to one aspect, the invention relates to a computerized system for controlling agricultural treatment comprising:
 a receiving module adapted to receive at least one two-dimensional image of an agricultural zone acquired by a sensor,
 a processing module adapted to determine a projected image in the horizontal plane of an agricultural treatment device from said two-dimensional image, a virtual portion of the agricultural zone identified as requiring agricultural treatment in the horizontal plane of the agricultural treatment device by using a neural network processing said projected image, a mean instant corresponding to a treatment instant of said virtual portion of the agricultural zone by using a relative location of an agricultural treatment device and of the sensor, and a speed of movement of the sensor, a lower bound and an upper bound of an activation time interval of the agricultural treatment device for the agricultural treatment of a portion of the agricultural zone identified as requiring agricultural treatment, said mean instant being within the activation time interval of predetermined duration such that the time interval includes a treatment instant of the portion of the agricultural zone.

According to one aspect, the invention relates to an agricultural machine comprising such a computerized agricultural treatment control system, a sensor adapted to acquire the two-dimensional image, and an agricultural treatment device adapted to treat the agricultural parcel during the time interval determined by the computerized agricultural treatment control system.

BRIEF DESCRIPTION OF THE DRAWINGS

Embodiments of the invention will be described below with reference to the drawings, briefly described below:

FIG. 1: a schematic representation of the complete device; and

FIG. 2: a structural schematic representation of the elements of the device of FIG. 1;

FIG. 3: a schematic front representation of a device for capturing a hyperspectral image according to an embodiment of the invention;

FIG. 4: a schematic structural representation of the elements of the device of FIG. 3;

FIG. 5: a structural schematic representation of the elements of a capture and detection device in a hyperspectral scene according to an embodiment of the invention;

FIG. 6: an alternative structural schematic representation of the elements of the device of the FIG. 5;

FIG. 7: a schematic representation of the diffractions obtained by the acquisition device of the FIG. 5;

FIG. 8: a schematic representation of the architecture of the neural network of the FIG. 5, FIG. 9: a structural schematic representation of the elements of a capture and detection device in a hyperspectral scene according to an embodiment of the invention;

FIG. 10: a schematic representation of the architecture of the neural network of FIG. 9.

FIG. 11: a schematic structural representation, seen in projection, of the elements of the device of FIG. 1.

In the drawings, like reference numerals designate the same or similar objects.

DETAILED DESCRIPTION

FIG. 1 illustrates a cooperative agricultural treatment control device intended to be mounted on an agricultural machine 1, said agricultural machine 1 comprising at least one controllable agricultural treatment device 3; said agricultural treatment control device comprising at least one system 2 for detecting weeds or leaf symptoms of deficiencies or diseases, each being mechanically adapted for attachment to the agricultural machine 1 and having an angle of sight of the acquisition objective in the direction of advance of said agricultural machine 1. As can be seen in particular in FIG. 1, the agricultural machine moves in the agricultural parcel 5 in a direction that is parallel to the vehicle. The detection systems 2 may be arranged spaced apart from one another in a horizontal direction transverse to the direction of advance. They may for example be carried by a transverse beam of the agricultural machine. To set forth the ideas, it is possible to define the axis "x" as the axis of advance of the agricultural machine, and "y" the transverse horizontal axis (substantially parallel to the main direction of the beam). The agricultural treatment device 3 is controllable in order to treat a zone to be treated downstream of the imaged zone by the system 2 for detecting weeds or leaf symptoms of deficiencies or diseases along the movement of the agricultural machine.

As illustrated in FIG. 2, the systems 2 for detecting weeds or leaf symptoms of deficiencies or diseases are fixed to the agricultural machine so as to capture the visual information of the agricultural parcel 5. In the exemplary embodiment, the systems 2 for detecting weeds or leaf symptoms of deficiencies or diseases have a field of view oriented in the direction of advance of the agricultural machine. In addition, the systems 2 for detecting weeds or leaf symptoms of deficiencies or diseases are above the ground. Consequently, the systems 2 for detecting weeds or leaf symptoms of deficiencies or diseases are oriented such that their focal axis is inclined relative to the horizontal plane. An orientation of 30°, an orientation of 45°, or an orientation of 60° relative to the horizontal plane is for example provided. For example, a hyperspectral sensor, such as described in the document FR187313, "hyperspectral acquisition detection device" or in the document FR1901202, "hyperspectral sensor fusion detection device", or in the document FR1905916, "hyperspectral detection device", or in the document WO2019EP85847, "hyperspectral detection device", may be used for each of said systems 2 for detecting weeds or foliar symptoms of deficiencies or diseases.

According to a first embodiment, the system 2 for detecting weeds or leaf symptoms of deficiencies or diseases comprises a capture device 10 and a computerized characterization module 21. FIG. 3 illustrates a capture device 10 comprising three juxtaposed sensors 11-13. FIG. 3 is presented in the inclined plane formed by the parallel focal axes of the three sensors. A first sensor 11 makes it possible to obtain a compressed image 14' of a focal plane P11' of an observed scene. As illustrated in FIG. 4, this first sensor 11 comprises a first converging lens 30 which focuses the focal plane P11' onto an aperture 31. A collimator 32 captures the rays passing through the aperture 31 and transmits these rays to a diffraction grating 33. A second convergent lens 34 focuses these rays coming from the diffraction grating 33 onto a capture surface 35.

The structure of this optical network is relatively similar to that described in the scientific publication "Computed-tomography imaging spectrometer: experimental calibration and reconstruction results", published in APPLIED OPTICS, volume 34 (1995) number 22.

This optical structure makes it possible to obtain a compressed image 14', illustrated in FIG. 7, having several diffractions R0-R7 of the focal plane P11' arranged around a small non-diffracted image. In the example of FIGS. 3, 4 and 7, the compressed image has eight distinct diffractions R0-R7 obtained with two diffraction axes of the diffraction grating 33 arranged as far apart as possible from one another in a plane normal to the optical axis, that is to say substantially orthogonal to one another.

The capture surface 35 may correspond to a CCD ("charge-coupled device") sensor, to a CMOS ("complementary metal-oxide-semiconductor" sensor in the English literature, a technology for manufacturing electronic components), or to any other known sensor. For example, the scientific publication "Practical Spectral Photography", published in Eurographics, volume 31 (2012) number 2, proposes associating this optical structure with a standard digital camera to capture the compressed image.

Preferably, each pixel of the compressed image 14' is coded in 8 bits thus making it possible to represent 256 colors.

A second sensor 12 makes it possible to obtain a non-diffracted image 17' of a focal plane P12' of the same observed scene, but with an offset induced by the offset between the first sensor 11 and the second sensor 12. This second sensor 12 corresponds to an RGB sensor, that is to say a sensor making it possible to code the influence of the three colors Red, Green and Blue of the focal plane P12'. It makes it possible to report the influence of the use of a blue filter F1, a green filter F2 and a red filter F3 on the observed scene.

This sensor 12 can be produced by a CMOS or CCD sensor associated with a Bayer filter. Alternatively, any other sensor may be used to acquire this RGB image 17'. Preferably, each color of each pixel of the RGB image 17' is 8-bit coded. Thus, each pixel of the RGB image 17' is encoded to 3 times 8 bits. Alternatively, a monochrome sensor could be used.

A third sensor 13 makes it possible to obtain an infrared 18', IR, image of a third focal plane P13' of the same scene observed also with an offset with the first 11 and the second sensors 12. This sensor 13 makes it possible to account for the influence of the use of an infrared filter F4 on the observed scene.

Any type of known sensor may be used to acquire this IR image 18. Preferably, each pixel of the IR image 18 is 8-bit coded. Alternatively, only either one of the sensor 12 and the sensor 13 is used.

The distance between the three sensors 11-13 may be less than 1 cm so as to obtain a significant overlap of the focal planes P11'-P13' by the three sensors 11-13. The sensors are for example aligned along the axis x. The topology and the number of sensors can vary without changing the invention.

For example, the sensors 11-13 may acquire an image of the same observed scene using semi-transparent mirrors to transmit the information of the observed scene to the different sensors 11-13. FIG. 3 illustrates a device 10 comprising three sensors 11-13.

Alternatively, other sensors may be mounted on the device 10 to increase the information contained in the hyperspectral image. For example, the device 10 may incorporate a sensor whose wavelength is between 0.001 nanometers and 10 nanometers or a sensor whose wavelength is between 10000 nanometers and 20000 nanometers.

As illustrated in FIG. 4, the device 10 also comprises a processing module 16 from the different diffractions R0-R7 of the diffracted image 14' and of the non-diffracted images 17', 18'.

In the example of FIGS. 3 and 4, in which the sensors 11-13 are juxtaposed, a pre-processing step is carried out to extract a focal plane P11-P13 present on each of the images 14', 17'-18' acquired by the three sensors 11-13.

This pre-processing consists, for each focal plane P11'-P13', in isolating 25 the common part from the focal planes P11'-P13' and then extracting 26 this common part in order to form the image 14, 17-18 of each focal plane P11-P13 observed by the specific sensor 11-13. The part of each image 14', 17'-18' to be isolated may be defined directly in a memory of the capture device 10 according to the choices of positioning of the sensors 11-13 between them, or a learning step may be used to identify the part to be isolated 25.

Preferably, the images 17'-18' from RGB and IR sensors are clipped using two-dimensional cross-correlation. The extraction of the focal plane of the diffracted image 14' is calculated by interpolating the x and y offsets between the sensors 12-13 in relation to the position of the sensor 11 of the diffracted image knowing the distance between each sensor 11-13. This pre-processing step is not always necessary, in particular, when the sensors 11-13 are configured to capture the same focal plane, for example with the use of semi-transparent mirrors.

Alternatively, as illustrated in FIG. 6, the capture device 202 may include a first converging lens 241 that focuses the focal plane 303 onto a mask 242. A collimator 243 captures the rays passing through the mask 242 and transmits these rays to a prism 244. A second convergent lens 245 focuses these rays coming from the prism 244 onto a capture surface 246. The mask 242 defines an encoding for the image 211.

The structure of this optical assembly is relatively similar to that described in the scientific publication "Compressive Coded Aperture Spectral Imaging", IEEE Signal Processing Magazine, Volume 31, Issue 1, Gonzalo R. Amerce, David J. Brady, Lawrence Carin, Henry Argueello, and David S. Kittle.

Alternatively, the capture surfaces 35 or 246 may correspond to the photographic acquisition device of a smartphone or any other portable device including a photographic acquisition device, by adding the capture device 202 of the hyperspectral scene in front of the photographic acquisition device.

As a variant, the acquisition system may comprise a compact and integrable mechanical embodiment in a portable and autonomous device and the detection system is included in said portable and autonomous device.

Alternatively, the capture surfaces 35 or 246 may be a device whose captured wavelengths are not in the visible part. For example, the device 202 may incorporate sensors whose wavelength is between 0.001 nanometers and 10 nanometers or a sensor whose wavelength is between 10000 nanometers and 20000 nanometers, or a sensor whose wavelength is between 300 nanometers and 2000 nanometers. It may be an infrared device.

Thus, the receiving module of the agricultural treatment control system receives the two-dimensional image or images acquired by the acquisition system.

In addition, each detection system 2 may comprise a location system, of the type comprising an inertial unit and/or a geolocation system. The localization system is used to determine the localization of the weed or leaf symptoms of deficiencies or diseases in a terrestrial frame of reference attached to the agricultural machine.

The projection of said image datum is calculated according to the following relations:

$$Img_{projetée} = R^{-1} Img_{acquise} \quad [72]$$

$$R = Rz \cdot Ry \cdot Rx \quad [73]$$

$$R_\gamma = \begin{bmatrix} 1 & 0 & 0 \\ 0 & \cos\gamma & -\sin\gamma \\ 0 & \sin\gamma & \cos\gamma \end{bmatrix} \quad [74]$$

$$R_\beta = \begin{bmatrix} \cos\beta & 0 & \sin\beta \\ 0 & 1 & 0 \\ -\sin\beta & 0 & \cos\beta \end{bmatrix} \quad [75]$$

$$R_\alpha = \begin{bmatrix} \cos\alpha & -\sin\alpha & 0 \\ \sin\alpha & \cos\alpha & 0 \\ 0 & 0 & 1 \end{bmatrix} \quad [76]$$

where:

$Img_{projetée}$ is the tensor containing the pixels of the projected image; and $Img_{acquise}$ is the tensor containing the pixels of said raw image datum in the sensor plane; and R is the matrix containing the rotations of the sensor along the three roll, pitch and yaw axes relative to the terrestrial frame of reference; and $\alpha$ is the yaw angle; and $\beta$ is the roll angle; and $\gamma$ is the pitch angle.

The angles $\alpha$, $\beta$, and $\gamma$, respectively correspond to the current yaw, roll and pitch angles of the capture device 10 as calculated from the raw data of the inertial unit embedded in the capture device 10; this roll, pitch and yaw information is continuously calculated and maintained up-to-date by the system 2 for detecting weeds or leaf symptoms of deficiencies or diseases considered by means of an attitude estimation algorithm using the raw information of said inertial unit embedded in the considered capture device 10.

The matrix acquise is $Img_{acquise}$ a rectangular matrix whose dimensions are the dimensions of the sensor. This matrix corresponds to a substantially trapezoidal zone of the ground. The matrix $Img_{projetée}$ is a matrix comprising a zone close to a trapezium. The long side of the trapezium substantially corresponding to the highest pixels of the sensor, capturing the image of the part furthest away from the ground, while the short side of the trapezium substantially corresponding to the lowest pixels of the sensor, capturing the image of the part closest to the ground. The non-zero zone has a trapezium shape if two of the yaw, roll and pitch angles are zero. Usually, these angles will in fact be close to zero. The matrix is completed with pixels of zero intensity so as to form a rectangular matrix.

More specifically, the above defined projection makes it possible to determine a matrix $Img_{projetée}$ in a horizontal plane.

As illustrated in FIG. 11, the ortho-projection of the acquired image information of the travelled agricultural parcel 5 makes it possible to obtain the projected images 7.1 and 7.2 from the images 6.1 and 6.2. In particular, given that it is not possible to know exactly the elevation of the ground at the location of the acquisition of the image, the projected images 7.1 or 7.2 represent a virtual portion of the agricultural zone in a horizontal plane. "Virtual portion" indicates here that the projected images 7.1 or 7.2 do not constitute an exact representation of the agricultural zone, but a representation offset and/or deformed according to the unknown elevation of the ground.

As shown in FIG. 5, when the image 211 of the observed hyperspectral focal plane is obtained, the detection system 2 implements a neural network 212 to detect a feature in the observed scene from the information of the compressed image 211.

This neural network 212 aims at determining the probability of presence of the feature sought for each pixel located at the x and y coordinates of the hyperspectral scene observed.

To do this, as illustrated in FIG. 8, the neural network 212 comprises an input layer 230, able to extract the information from the projected image 211 and an output layer 231, able to process this information so as to generate an image whose intensity of each pixel at coordinates x and y, corresponds to the probability of presence of the feature at coordinates x and y of the hyperspectral scene.

The input layer 230 is populated from pixels forming the compressed image. Thus, the input layer is a tensor of order three, and has two spatial dimensions of size XMAX and YMAX, and a depth dimension of size DMAX, corresponding to the number of subsets of the compressed image copied to the input layer. The invention uses the nonlinear relationship $f(x_t, y_t, d_t) \rightarrow (x_{img}, y_{img})$ defined for $x_t \in [0 \ldots \text{XMAX}[$, $y_t \in [0 \ldots \text{YMAX}[$ and $d_t \in [0 \ldots \text{DMAX}[$ making it possible to calculate the coordinates $x_{img}$ and $y_{img}$ of the pixel of the compressed image whose intensity is copied into the tensor of order three of said input layer of the neural network at the coordinates $(x_t, y_t, d_t)$.

For example, in the case of a compressed image 211 obtained from the capture device of FIG. 5, the input layer 230 may be populated in the following manner:

$$f(x_t, y_t, d_t) = \begin{cases} x_{img} = x + x_{offsetX}(n) + \lambda \cdot \lambda_{sliceX} \\ y_{img} = y + y_{offsetY}(n) + \lambda \cdot \lambda_{sliceY} \end{cases} \quad [87]$$

with:
n=floor(M($d_t$−1)/$D_{MAX}$);
n ranging from 0 to M, the number of diffractions of the compressed image;
$\lambda = (d_t-1) \bmod(D_{MAX}/M)$;
$d_t$ between 1 and $D_{MAX}$;
$x_t$ between 0 and $X_{MAX}$;
$y_t$ between 0 and $Y_{MAX}$;
$X_{MAX}$ the size along the x axis of the tensor of order three of the input layer;
$Y_{MAX}$ the size along the y axis of the tensor of order three of the input layer;
$D_{MAX}$ the depth of the tensor of order three of the input layer;
$\lambda_{sliceX}$, the constant of the spectral pitch along the x-axis of said compressed image;
$\lambda_{sliceY}$, the constant of the spectral pitch along the y axis of said compressed image;

$X_{offsetX}(n)$ corresponding to the offset along the x axis of the diffraction n;
$Y_{offsetY}(n)$ corresponding to the offset along the y axis of the diffraction n.
Floor is a well known truncation operator.
Mod represents the modulo mathematical operator.

As can be seen in particular in FIG. 8, each slice, in depth, of the input tensor of order three of the neural network, receives a portion of a diffraction lobe substantially corresponding to a wavelength interval.

As a variant, the invention makes it possible to correlate the information contained in the various diffractions of the diffracted image with information contained in the non-diffracted central part of the image.

According to this variant, it is possible to add an additional slice in the direction of the depth of the input layer, the neurons of which will be populated with the intensity detected in the pixels of the compressed image corresponding to the non-diffracted detection. For example, if the coordinate $d_t$=0 is assigned to this slice, the above formula can be retained for the populating of the input layer for $d_t$ greater than or equal to 1, and populating the layer $d_t$=0 in the following manner:

$$X_{img} = (\text{Img}_{width}/2) - X_{MAX} + x_t$$

$$Y_{img} = (\text{Img}_{height}/2) - Y_{MAX} + y_t$$

With:
$\text{Img}_{width}$ the size of the compressed image along the x axis;
$\text{Img}_{height}$ the size of the compressed image along the y axis.

The compressed image obtained by the optical system contains the focal plane of the scene not diffracted at the center, as well as the projections diffracted along the axes of the various diffraction filters. Thus, the neural network uses, for the direct detection of the features sought, the information of said at least one following diffracted image:
 the light intensity in the central and not diffracted part of the focal plane of the scene at the x and y coordinates; and
 light intensities in each of the diffractions of said compressed image whose coordinates x' and y' are dependent on the coordinates x and y of the undiffracted central part of the focal plane of the scene.

Alternatively, in the case of a compressed image 211 obtained from the capture device of FIG. 6, the input layer 230 may be populated as follows:

$$f(Xt,yt,dt) = \{(X_{img}=x_t); (Y_{img}=x_t)\}_{(Img=MASK \text{ if } dt=0; \; Img=CASSI \text{ if } dt>0)},$$

With:
MASK: Image of the Compression Mask used,
CASSI: measured compressed image,
Img: Selected Image whose pixel is copied.
On slice 0 of the tensor of order three of the input layer is copied the image of the compression mask used.
To the other slices of the tensor of order three of the input layer is copied the compressed image of the hyperspectral scene.

The architecture of said neural network 212 is composed of a set of convolutive layers assembled linearly and alternately with decimation (pooling), or interpolation (unpooling) layers.

A convolved layer of depth d, denoted CONV(d), is defined by convolution kernels, each of these convolution kernels being applied to the volume of the input tensor of order three and of size $x_{input}, y_{input}, d_{input}$. The convoluted layer thus generates an output volume, tensor of order three, having a depth d. An activation function ACT is applied to the calculated values of the output volume of this convoluted layer.

The parameters of each convolution kernel of a convoluted layer are specified by the neural network learning procedure.

Various activation functions ACT may be used. For example, this function may be a function ReLu, defined by the following equation:

$$ReLu(i) = \max(0, i)$$

In alternation with the convolutive layers, decimation layers (pooling), or interpolation layers (unpooling) are inserted.

A decimation layer makes it possible to reduce the width and the height of the tensor of order three at the input for each depth of said tensor of order three. For example, a MaxPool(2,2) decimation layer selects the maximum value of a sliding tile on the surface of 2×2 values. This operation is applied to all the depths of the input tensor and generates an output tensor having the same depth and a width divided by two, as well as a height divided by two.

An interpolation layer makes it possible to increase the width and the height of the tensor of order three at input for each depth of said tensor of order three. For example, a MaxUnPool(2,2) interpolation layer copies the input value of a sliding point on the surface of 2×2 output values. This operation is applied to all the depths of the input tensor and generates an output tensor having the same depth and a width multiplied by two, as well as a height multiplied by two.

A neural network architecture allowing the direct detection of features in the hyperspectral scene may be as follows:
Input
=>CONV(64)
=MaxPool(2,2)
=>CONV(64)
=MaxPool(2,2)
=>CONV(64)
=MaxPool(2,2)
=>CONV(64)
=>CONV(64)
=MaxUnpool(2,2)
=>CONV(64)
=MaxUnpool(2,2)
=>CONV(64)
=>MaxUnpool(2,2)
=>CONV(1)
=>Output Alternatively, the number of convolution CONV(d) and decimation MaxPool(2,2) layers may be modified in order to facilitate the detection of features having higher semantic complexity. For example, a higher number of convolution layers makes it possible to process more complex signatures of shape, texture, or spectral of the feature sought in the hyperspectral scene.

As a variant, the number of deconvolution CONV(d) and MaxUnpool(2, 2) interpolation layers can be modified in order to facilitate the reconstruction of the output layer. For example, a higher number of deconvolution layers allows to reconstruct an output with higher accuracy.

Alternatively, the convolution layers CONV(64) may have a depth different from 64 in order to process a different number of local features. For example, a depth of 128 makes it possible to locally process 128 different features in a complex hyperspectral scene.

As a variant, the interpolation layers MaxUnpool (2, 2) may have different interpolation dimensions. For example, a MaxUnpool layer (4, 4) makes it possible to increase the processing dimension of the upper layer.

As a variant, the activation layers ACT of type ReLu(i) inserted following each convolution and deconvolution, may be of different type. For example, the softplus function defined by the equation: $f(i)=\log(1+e^i)$ may be used.

Alternatively, the decimation layers MaxPool (2, 2) may have different decimation dimensions. For example, a Max-Pool (4, 4) layer makes it possible to reduce the spatial dimension more rapidly and to concentrate the semantic search for the neural network on the local features.

Alternatively, fully connected layers may be inserted between the two central convolution layers of line 6 of the description in order to process detection in a higher mathematical space. For example, three fully connected layers of size 128 may be inserted.

As a variant, the dimensions of the convolution layers CONV(64), decimation MaxPool(2, 2), and interpolation MaxUnpool(2, 2) may be adjusted on one or more layers, in order to adapt the neural network architecture as close as possible to the type of features sought in the hyperspectral scene.

As a variant, normalization layers, for example of the BatchNorm or GroupNorm type, as described in "Batch Normalization: Accelerating Deep Network Training by Reducing Internal Covariate Shift", Sergey Ioffe, Christian Szegedy, February 2015 and "Group Normalization", Yuxin Wu, Kaiming He, FAIR, June 2018, can be inserted before or after each activation layer or at different levels of the neural network structure.

The weights of said neural network 212 are calculated by means of learning. For example, learning by backpropagation of the gradient or its derivatives from learning data can be used to calculate these weights.

As a variant, the neural network 212 can determine the probability of presence of several distinct features within the same observed scene. In this case, the last convoluted layer will have a depth corresponding to the number of distinct features to be detected. Thus, the convoluted layer CONV(1) is replaced by a convoluted layer CONV(u), where u corresponds to the number of distinct features to be detected.

The embodiment described above can use only a single sensor 11. According to the embodiment described in relation with FIG. 4, the device for capturing a hyperspectral scene comprises a set of sensors making it possible to obtain at least one two-dimensional compressed image 211 or 213, at least one standard image 312 of the hyperspectral focal plane of the observed scene, and at least one infrared image thereof, the data then being placed at the input of the neural network 20. As a variant, as represented in FIG. 9, the device 301 for acquiring a hyperspectral scene comprises a set of sensors making it possible to obtain at least one two-dimensional compressed image 211 and one two-dimensional compressed image 213 and at least one standard image 312 of a hyperspectral focal plane 303 of an observed scene.

The capture device 102 may thus comprise an uncompressed "standard" image acquisition device, comprising a converging lens 331 and a capture surface 232. The capture device 102 may further comprise a device for acquiring a compressed image as described above with reference to FIG. 6, and a device for acquiring a compressed image as described above with reference to FIG. 5.

In the example presented, the standard image acquisition device and the compressed image acquisition device are arranged juxtaposed with parallel optical axes, and optical beams at least partially overlapping. Thus, a portion of the hyperspectral scene is imaged both by the acquisition devices. Thus, the focal planes of the various image acquisition sensors are offset relative to one another transversely to the optical axes of these sensors.

As a variant, a set of partially reflecting mirrors is used so as to capture a standard non-diffracted image 312 and said at least one compressed image 211, 213 of the same hyperspectral scene 203 on several sensors simultaneously.

As a variant, the capture surface 232 may be a device whose captured wavelengths are not in the visible part. For example, the device 202 may incorporate sensors whose wavelength is between 0.001 nanometers and 10 nanometers or a sensor whose wavelength is between 10000 nanometers and 20000 nanometers, or a sensor whose wavelength is between 300 nanometers and 2000 nanometers.

When the images 211, 312 or 213 of the observed hyperspectral focal plane are obtained, the detection means implement a neural network 214 to detect a feature in the observed scene from the information of the compressed images 211 and 213, and the standard image 312.

Alternatively, only the compressed image 211 and the standard image 312 are used and processed by the neural network 214.

Alternatively, only the compressed image 213 and the standard image 312 are used and processed by the neural network 214.

Thus, when the description relates to a set of compressed images, it is at least one compressed image.

This neural network 214 aims at determining the probability of presence of the feature sought for each pixel located at the x and y coordinates of the hyperspectral scene observed.

To do this, as illustrated in FIG. 10, the neural network 214 comprises an encoder 251 for each compressed image and for each uncompressed image; each encoder 251 has an input layer 250, able to extract the information from the image 211, 312 or 213. The neural network merges the information from the various encoders 251 by means of convolution layers or fully connected layers 252 (the particular case shown in the figure). A decoder 253 and its decoder layer output 350, able to process this information so as to generate an image whose intensity of each pixel, at the x and y coordinate, corresponds to the probability of presence of the feature at the x and y coordinates of the hyperspectral scene, is inserted following the merging of the information.

As illustrated in FIG. 8, the input layer 250 of an encoder 251 is filled with the various diffractions of the compressed image 211 as described above.

The population described above corresponds to the population of the first input ("Input1") of the neural network, according to the architecture presented below.

For the second input ("Input2") of the neural network, the populating of the input layer relating to the "standard" image is populated by copying directly the "standard" image in the neural network.

According to an exemplary embodiment where a compressed image 213 is also used, the third input "Input3" of the neural network is populated as described above for the compressed image 213.

A neural network architecture allowing the direct detection of features in the hyperspectral scene may be as follows:
Input1 Input2 Input3
=>CONV(64)=>CONV(64)=>CONV(64)
=>MaxPool(2,2)=>MaxPool(2,2)=>MaxPool(2,2)
=>CONV(64)=>CONV(64)=>CONV(64)
=>MaxPool(2,2)=>MaxPool(2,2)=>MaxPool(2,2)
=>CONV(64)
=>CONV(64)
=>MaxUnpool (2,2)
=>CONV(64)
=>MaxUnpool (2,2)
=>CONV(64)
=>MaxUnpool(2,2)
=>CONV(1)
=>Output In this description, "Input1" corresponds to the portion of the input layer 250 populated from the compressed image 211. "Input2" corresponds to the portion of the input layer 250 populated from the standard image 312, and "Input3" corresponds to the portion of the input layer 250 populated from the compressed image 213. Line "CONV(64)" at the fifth line of the architecture performs the merging of the information.

As a variant, the line "CONV(64)" at the fifth line of the architecture performing the merging of the information can be replaced by an entirely connected layer having as input the set of outputs MaxPool(2, 2) of the processing paths of the set of inputs "input1", "input2" and "input3" and as output a tensor of order one serving as input to the following layer "CONV(64)" presented at the sixth line of the architecture.

In particular, the merging layer of the neural network takes into account the offsets of the focal planes of the various image acquisition sensors, and integrates the homographic function making it possible to merge the information from the various sensors by taking into account the parallaxes of the various images.

The variants presented above for the embodiment of FIG. 8 can also be applied here.

The weights of said neural network 214 are calculated by means of learning. For example, learning by backpropagation of the gradient or its derivatives from learning data can be used to calculate these weights.

As a variant, the neural network 214 may determine the probability of presence of several distinct features within the same observed scene. In this case, the last convoluted layer will have a depth corresponding to the number of distinct features to be detected. Thus, the convoluted layer CONV(1) is replaced by a convoluted layer CONV(u), where u corresponds to the number of distinct features to be detected.

According to a variant embodiment, as represented in FIG. 8, a separate dedicated acquisition device is not necessarily used to obtain the "standard" image 312. Indeed, as presented above in relation to FIG. 5, in some cases, a portion of the compressed image 211 comprises a "standard" image of the hyperspectral scene. This is in particular the image portion C described above. In this case, this image portion "C" of the compressed image 211 can be used as a "Standard" image for input of the neural network.

Thus, the neural network 214 uses, for the direct detection of the features sought, the information of said at least one compressed image as follows:
  the light intensity in the central and not diffracted part of the focal plane of the scene at the x and y coordinates; and
  the light intensities in each of the diffractions of said compressed image whose coordinates x' and y' are dependent on the coordinates x and y of the undiffracted central part of the focal plane of the scene.

The invention has been presented above in various variants, in which a detected feature of the hyperspectral scene is determined from a two-dimensional image whose value of each pixel at the coordinates x and y corresponds to the probability of presence of a feature at the same coordinates x and y of the hyperspectral focal plane of the scene. In particular, the feature corresponds to a feature potentially indicative of the presence of a weed or of leaf symptoms of deficiencies or diseases in this pixel. This two-dimensional image is used to determine the location, in the frame of reference of the projected image, of the weed or leaf symptoms of deficiencies or diseases. The location is for example determined as the barycenter of a set of juxtaposed pixels for which the intensity of the probability of detection is greater than a predetermined threshold. Each weed, each leaf symptom of deficiencies or diseases may be characterized by one or more features. The detection system then combines the results of the detection of each feature associated with a weed or with a leaf symptom of deficiencies or diseases in order to determine a probability of presence of the weed or of the leaf symptom of deficiencies or diseases. Where appropriate, this process is repeated for all the predetermined weeds or leaf symptoms of deficiencies or diseases sought in the parcel. However, as a variant, it is possible to provide, according to the embodiments of the invention, the detection of other features. According to one example, such another feature can be obtained from the image derived from the neural network presented above. For this purpose, the neural network 212, 214 may have a subsequent layer, adapted to process the image in question and determine the desired feature.

According to a variant, it will be understood that the neural network can also be architected to determine this feature and the location of the latter in the frame of reference of the projected image without passing through the determination of an image of probabilities of presence of the feature in each pixel.

In the context of the present patent application, the detection system described above is considered to be a single detection system, even if the latter uses various sensors, the information of which is merged in order to detect a weed or a leaf syndrome of deficiencies or diseases.

The plurality of said at least one controllable agricultural treatment device 3 is also fixed to the agricultural machine so as to be able to treat the target plants 4. As can be seen in particular in FIG. 1, the agricultural treatment devices 3 can be arranged spaced apart from one another in a horizontal direction transverse to the direction of advance. They may for example be carried by a transverse beam of the agricultural machine, where appropriate by the same beam which carries the detection systems 2. In addition, they may be spaced apart therefrom in the transverse direction. The agricultural treatment control device further comprises a system for locating the agricultural treatment devices. The system for locating can be shared with the location system of the detection systems 2 if the relative position of the agricultural treatment devices 3 and of the detection systems 2 is known. The agricultural treatment control device further comprises a communication system connecting the systems 2 for detecting weeds or leaf symptoms of deficiencies or diseases. The agricultural treatment device further comprises a communication system adapted to exchange data between the systems 2 for detecting weeds or leaf symptoms of deficiencies or diseases and the agricultural treatment devices 3.

It is not necessary for the number of controllable agricultural treatment devices 3 to be the same as the number of systems 2 for detecting weeds or leaf symptoms of deficiencies or diseases. Indeed, according to one example, the collaborative treatment decision is transmitted to the controllable agricultural treatment device 3 having the shortest distance to the target plant.

FIG. 11 illustrates the device, provided with two systems 2 for detecting weeds or leaf symptoms of deficiencies or diseases, mounted on an agricultural machine 1, in which each of the systems 2 for detecting weeds or leaf symptoms of deficiencies or diseases is directed at an angle toward the ground of the agricultural parcel 5, and having an overlap of their respective detection zones. Hereinafter, the first detection system will be characterized by the reference "1", and the second detection system will be characterized by the reference "0.2".

At each instant, said system 2.1 for detecting weed or leaf symptoms of deficiencies or diseases takes a photography 6.1 of the zone of the agricultural parcel 5 facing its objective; said system 2.2 for detecting weed or leaf symptoms of deficiencies or diseases takes a photography 6.2 of the zone of the agricultural parcel 5 facing its objective; said zones facing the optical objectives 9 of said systems 2.1 and 2.2 for detecting weeds or leaf symptoms of deficiencies or diseases have a common acquisition zone.

Said projected image data are used to detect the presence of weeds or leaf symptoms of deficiencies or diseases since the particular features specific to the weed or leaf symptoms of deficiencies or diseases determined by one of the above methods, in order to detect the zones, identified at the coordinates of the projected image $X_{target}$ and $Y_{target}$, in said projected image data in which the target plants 4 are present. A target plant 4 is a plant for which the detection device detects a weed or leaf symptoms of deficiencies or diseases. Thus, each of the detections of the presence of weed or leaf symptoms of deficiencies or diseases is supplemented with a probability of the presence of said features specific to the weed or leaf symptoms of deficiencies or diseases.

A localization of the detections of weed or of leaf symptoms of deficiencies or diseases is used in an instantaneous reference frame of the agricultural machine. Such a location can be sufficient, insofar as the processing can also be controlled in this reference frame. This may be the case in particular if the detection systems and the treatment systems have known relative positions over time, for example are fixed relative to one another over time. Consequently, the horizontal plane in which the location of the weed or of the leaf symptoms of deficiencies or diseases is determined is the horizontal plane travelled by the treatment tool during the movement of the agricultural machine. For a system for detecting weed or leaf symptoms of deficiencies or diseases, the coordinates ($x_{target}$; $Y_{target}$) of the target with respect to the center of the sensor can for example be determined as follows, in the frame of reference of the agricultural machine:

$$\text{Dist}_{away} = \tan(\text{sensor}_{angle}).$$

$$X_{target} = \text{ratiopixel2 meter} \cdot (X_{detect} - w_{img}/2)$$

$$Y_{target} = \text{dist}_{away} + \text{ratiopixel2 meter} \cdot (Y_{detect} - h_{img}/2)$$

where:

$\text{Sensor}_{angle}$ is a predetermined angle measured between the vertical and the mean angle of sight of the system 2 for detecting weeds or leaf symptoms of deficiencies or diseases.

$\text{Sensor}_{height}$ is a predetermined distance from the system 2 for detecting weeds or leaf symptoms of deficiencies or diseases to a horizontal reference plane which is intended to correspond to an average horizontal plane of the soil;

ratiopixel2 meter is the ratio between a pixel of the image and a meter on the ground;

$X_{detect}$ is the x coordinate, in pixels, of the center of the detection in the projected image;

$Y_{detect}$ is the y coordinate, in pixels, of the center of the detection in the projected image;

$W_{img}$ is the width of the projected image in pixels;

$h_{img}$ is the height of the projected image in pixels;

$X_{target}$ is the relative longitudinal coordinate in meters of the target plant 4 detected in the projected image;

$Y_{target}$ is the relative coordinate in meters facing said system 2 for detecting weeds or leaf symptoms of deficiencies or diseases of the target plant 4 detected in the projected image.

Each of the systems for detecting weeds or leaf symptoms of deficiencies or diseases continuously calculates the instantaneous speed of movement by means of said location information of the system for detecting weeds or leaf symptoms of deficiencies or diseases continuously obtained by means of the location system. The speed information is necessary in order to estimate the instant of control of the agricultural treatment device and to anticipate the processing time as a function of the agricultural treatment device.

Alternatively, the instantaneous speed of displacement is obtained by the control system by communication with the controller of the agricultural machine.

Thus, as a function of the detected nature and location of the weeds or leaf symptoms of deficiencies or diseases, of the nature and the location of the treatment devices, and of the speed of displacement, the control device determines the treatment device or devices to be actuated, and the temporal characteristics (time, duration, etc.) of this actuation.

The processing module determines an activation time interval of the agricultural treatment device 3 for the agricultural treatment of the portion of the agricultural zone identified as requiring agricultural treatment. The time interval has a predetermined duration including an instant of treatment of the portion of the agricultural zone around a mean instant determined for a portion of the agricultural zone identified as requiring a determined agricultural treatment in the horizontal plane of the treatment tool. The instant determined for the portion of the agricultural zone identified as requiring a determined agricultural treatment in the horizontal plane of the treatment tool is called the "mean" instant because it is situated by definition within the treatment time interval, which is determined from this "mean" instant. The time interval for the treatment may for example comprise a lower bound and an upper bound the average of which corresponds to the "mean" instant. In this case, the time interval is determined to last for a sufficient time for the agricultural treatment device 3 to treat an agricultural zone that comprises the target plant 4, independently of the exact location of the target plant 4 in the terrestrial frame of reference.

To take a simple example, where the agricultural machine moves at a constant speed $v_0$, the time interval for agricultural treatment is comprised between a first bound $t1=(X_{detect}+X_D-X_{m1})/v_0$ and a second bound $t2=(X_{detect}+X_D+X_{m2})/v_0$, where:

$X_D$ is a predetermined value representing the abscissa of the treatment device 3 in the horizontal plane of the treatment tool in the frame of reference of the agricultural machine;

$X_{m1}$ is a predetermined value corresponding to an upstream offset;

$X_{m2}$ is a predetermined value corresponding to a downstream offset.

The coordinate $Y_{Detect}$ can itself be taken into account to select the agricultural treatment device 3 from among several agricultural treatment devices spaced along the y direction.

Assuming that the speed of the agricultural machine is not constant, an integral calculation can be performed to determine the activation time interval.

The rotation matrix only takes into account the orientation of the sensor. Thus, for a given orientation of the sensor in the terrestrial reference frame one applies the same transformation to the matrix representing the acquired image to obtain the projected image. The projected image is considered to be obtained substantially above the target plant in the horizontal plane of movement of the treatment tool.

The time interval corresponding to the activation of the agricultural treatment device 3 is long enough for the agricultural treatment to take place at the moment when the activated agricultural treatment device 3 treats the zone to be treated.

If the ground is sloping, the above determination makes it possible to determine the position of the weed in an instantaneous horizontal plane of the treatment tool. As a variant, however, if means are available for determining the orientation of the detection system 2 in space relative to the terrestrial vertical, this orientation can be taken into account during the calculation of the projected image. The horizontal plane of the treatment tool is then a plane parallel to the ground.

As regards the calculation of the command to be sent to said at least one agricultural treatment device 3, the control commands are transmitted to said at least one agricultural treatment device by means of the communication means between said systems for detecting weeds or leaf symptoms of deficiencies or diseases and said agricultural treatment device.

As regards the control of said at least one agricultural treatment device, the agricultural treatment devices are actuated for a duration that includes the instant when the agricultural treatment device is above the target plant.

For example, when said at least one agricultural treatment device 3 is a spreading nozzle, the command to be sent to each of said at least one agricultural treatment device 3 is a pressure and flow rate command taking into account the presence of a target plant during the time interval in the spraying zone of said spreading nozzle.

Alternatively, when said at least one agricultural treatment device 3 is a LASER, the command to be sent to each of said at least one agricultural treatment device 3 is a command for transverse and longitudinal offsets, and for light power taking into account the presence of a target plant during the time interval in the range zone of said LASER.

Alternatively, when said at least one agricultural treatment device 3 is a high-pressure water jet, the command to be sent to each of said at least one agricultural treatment device 3 is a pressure and flow rate command taking into account the presence of a target plant during the time interval in the range zone of the high-pressure water injection nozzle.

As a variant, when said at least one agricultural treatment device 3 is a mechanical weeding tool, the command to be sent to each of said at least one agricultural treatment device 3 is an activation command taking into account the presence of a target plant during the time interval in the zone of said mechanical weeding tool.

As a variant, when said at least one agricultural treatment device 3 is an electric weeding tool, the command to be sent to each of said at least one agricultural treatment device 3 is an activation command taking into account the presence of a target plant during the time interval in the zone of said electric weeding tool.

In the above presentation, the acquired image is first projected in a given frame of reference, then the detection of weed or leaf symptoms of deficiencies or diseases is implemented for the projected image. As a variant, provision could be made to start by producing an image of probability of presence of weed or of leaf symptoms of deficiencies or of detection from the raw acquired image, then to orthoproject the latter into the given reference frame.

For example, said communication system between said at least two systems 2 for detecting weeds or leaf symptoms of deficiencies or diseases and said at least one agricultural treatment device 3 is a 1 Gigabit per second Ethernet wired network thus allowing each of said at least two systems 2 for detecting weeds or leaf symptoms of deficiencies or diseases to communicate with the other systems 2 for detecting weeds or leaf symptoms of deficiencies or diseases as well as with said at least one agricultural treatment device 3.

The methods which are described may be computerized methods. They can then be defined in computer programs, which can be executed by one or more processors of programmable machines.

REFERENCES

Agricultural machine 1
systems 2 for detecting weeds or leaf symptoms of deficiencies or diseases
detection systems 2.1 and 2.2
agricultural treatment device 3
target plant 4
agricultural parcel 5
photographies 6.1, 6.2
images 7.1 and 7.2 acquired from images 6.1 and 6.2
optical objective 9
capture device 10
first sensor 11
second sensor 12
third sensor 13
diffracted images 14, 14'
processing module 16
non-diffracted image 17, 17"
infrared image 18, 18'
neural network 20
characterization module 21
isolating 25
Extracting 26
first converging lens 30
aperture 31
collimator 32
diffraction grating 33
second convergent lens 34
capture surface 35
capture device 102
capture device 202
two-dimensionally compressed image 211
neural network 212
compressed image 213
neural network 214
input layer 230
output layer 231
capture surface 232
first converging lens 241
mask 242
collimator 243
prism 244
second convergent lens 245
capture surface 246
input layer 250
encoder 251
convolution layers or fully connected layers 252
decoder 253
acquisition device 301
focal plane 303
Standard image 312
converging lens 331
output layer 350

The invention claimed is:

1. A computerized method for controlling agricultural treatment, wherein the computerized method for controlling agricultural treatment comprises:
a receiving module receives at least one two-dimensional image of an agricultural zone acquired by a sensor,
a processing module determines an image projected in the horizontal plane of the agricultural treatment device from said two-dimensional image,
the processing module determines a virtual portion of the agricultural zone identified as requiring agricultural treatment in the horizontal plane of the agricultural treatment device (3) by using a neural network processing said projected image,
the processing module determines a mean instant corresponding to an instant of treatment of said virtual portion of the agricultural zone by using a relative location of an agricultural treatment device and of the sensor, and a speed of movement of the sensor,
the processing module determines a lower bound and an upper bound of an activation time interval of the agricultural treatment device for the agricultural treatment of a portion of the agricultural zone identified as requiring agricultural treatment, said mean instant being within the activation time interval of predetermined duration such that the time interval includes an instant of treatment of the portion of the agricultural zone.

2. The computerized method for controlling according to claim 1, wherein the two-dimensional image comprises at least one diffraction comprising hyperspectral characteristics, and wherein the neural network processes said hyperspectral information.

3. The computerized method for controlling according to claim 1, wherein the neural network further processes a non-diffracted two-dimensional image of the agricultural zone.

4. The computerized method according to claim 1, wherein the processing module implements a projection taking into account the instantaneous orientation of the sensor.

5. The computerized method according to claim 1, further comprising: the sensor acquires the two-dimensional image of the agricultural zone, and transmits the two-dimensional image to the receiving module.

6. An agricultural treatment method, wherein the computerized method for controlling agricultural treatment according to claim 1 is applied, and in which agricultural treatment is applied for the determined time interval.

7. The agricultural treatment method according to claim 6, wherein an agricultural treatment device is selected from a plurality of agricultural treatment devices from locations of a plurality of agricultural treatment devices.

8. A computer program product comprising a non-transitory computer readable medium encoded with an information processing program for use in an information processing device, the program when executed performs the method according to claim 1.

9. A computerized control system for agricultural treatment wherein the computerized control system for agricultural treatment comprises:
  a receiving module adapted to receive at least one two-dimensional image of an agricultural zone acquired by a sensor,
  a processing module adapted to determine a projected image in the horizontal plane of an agricultural treatment device from said two-dimensional image, a virtual portion of the agricultural zone identified as requiring agricultural treatment in the horizontal plane of the agricultural treatment device by using a neural network processing said projected image, a mean instant corresponding to a treatment instant of said virtual portion of the agricultural zone by using a relative location of an agricultural treatment device and of the sensor, and a speed of movement of the sensor, a lower bound and an upper bound of an activation time interval of the agricultural treatment device for the agricultural treatment of a portion of the agricultural zone identified as requiring agricultural treatment, said mean instant being within the activation time interval of predetermined duration such that the time interval includes a treatment instant of the portion of the agricultural zone.

10. An agricultural machine comprising the computerized agricultural treatment control system according to claim 9, a sensor adapted to acquire the two-dimensional image, and an agricultural treatment device adapted to treat the agricultural parcel during the time interval determined by the computerized agricultural treatment control system.

* * * * *